Figure 1:
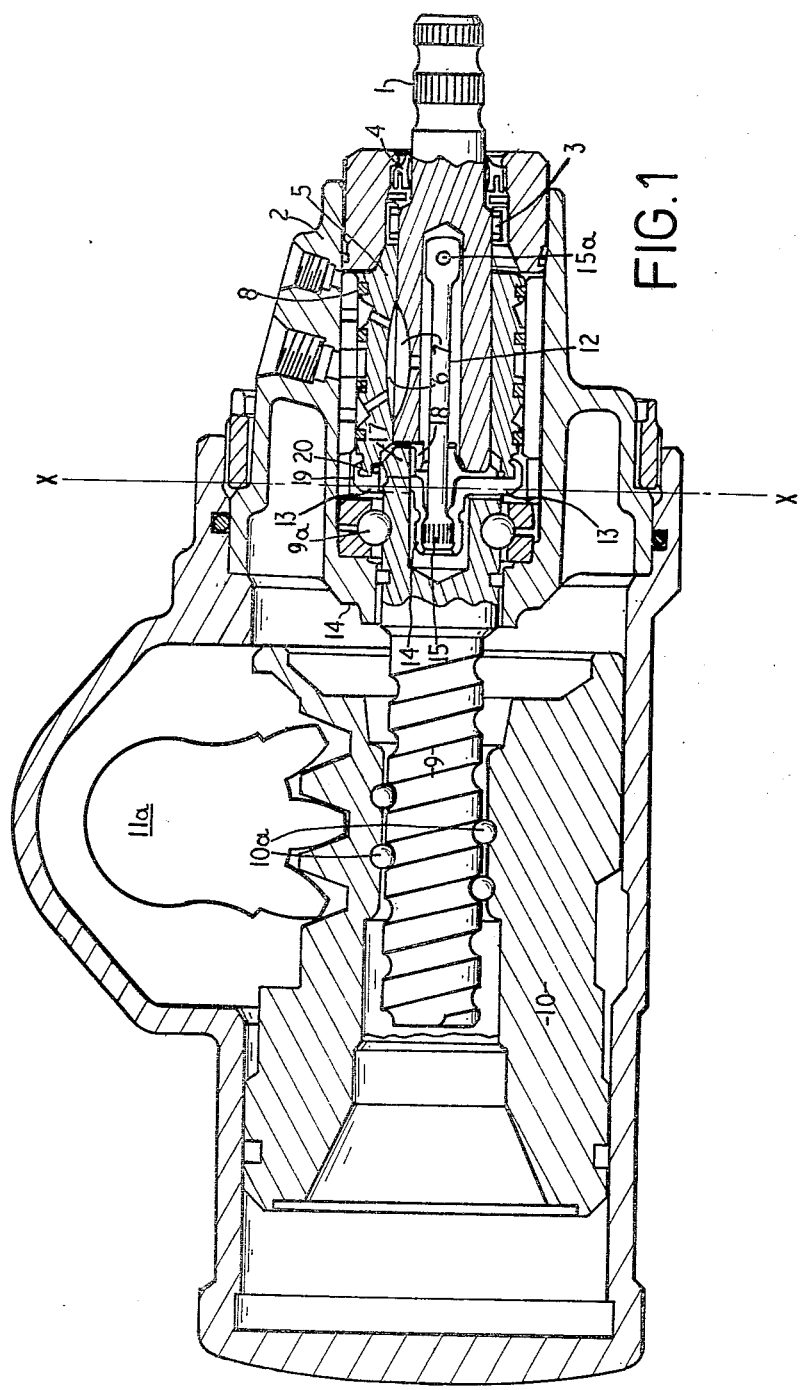

United States Patent [19]

Bishop

[11] 4,194,531

[45] Mar. 25, 1980

[54] ROTARY VALVES

[76] Inventor: Arthur E. Bishop, 17 Burton St., Mosman, N.S.W. 2088, Australia

[21] Appl. No.: 813,272

[22] Filed: Jul. 6, 1977

[30] Foreign Application Priority Data

Jul. 9, 1976 [AU] Australia .............................. PC6610
Oct. 26, 1976 [AU] Australia .............................. PC7893

[51] Int. Cl.$^2$ ............................................. F15B 9/10
[52] U.S. Cl. .............................. 137/596; 137/625.24; 91/375 A
[58] Field of Search ......... 91/375 A; 137/596, 625.24

[56] References Cited

U.S. PATENT DOCUMENTS

| 1,947,973 | 2/1934 | Davis . | |
|---|---|---|---|
| 2,362,930 | 11/1944 | Robbins . | |
| 2,640,322 | 6/1953 | Puerner . | |
| 3,022,772 | 2/1962 | Zeigler et al. . | |
| 3,145,626 | 8/1964 | Vickers et al. . | |
| 3,602,255 | 8/1971 | Bishop .............................. | 91/375 A |

FOREIGN PATENT DOCUMENTS 636500 10/1936 Fed. Rep. of Germany .

*Primary Examiner*—Paul E. Maslousky
*Attorney, Agent, or Firm*—Hill, Van Santen, Steadman, Chiara & Simpson

[57] ABSTRACT

An improved rotary hydraulic valve to control the hydraulic assistance in power steering gears for automotive vehicles, comprising a valve input member, a coaxially arranged driven member, torsion bar means drivingly connecting said valve input member and said driven member, a first drive transmitting means for transmitting drive from said valve input member to said driven member arranged for limited lost motion between said valve input and driven members comprising a plurality of axially extending inter engaging lug means alternately extending from said valve input and driven members, a valve sleeve member surrounding said valve input member, second drive transmitting means carried on a portion of the lug means of said driven member arranged to provide a slack-free driving connection between said valve sleeve member and said driven member, and means associated with said second drive transmitting means securing said valve sleeve member to said driven member in a preadjusted angular relationship.

8 Claims, 5 Drawing Figures

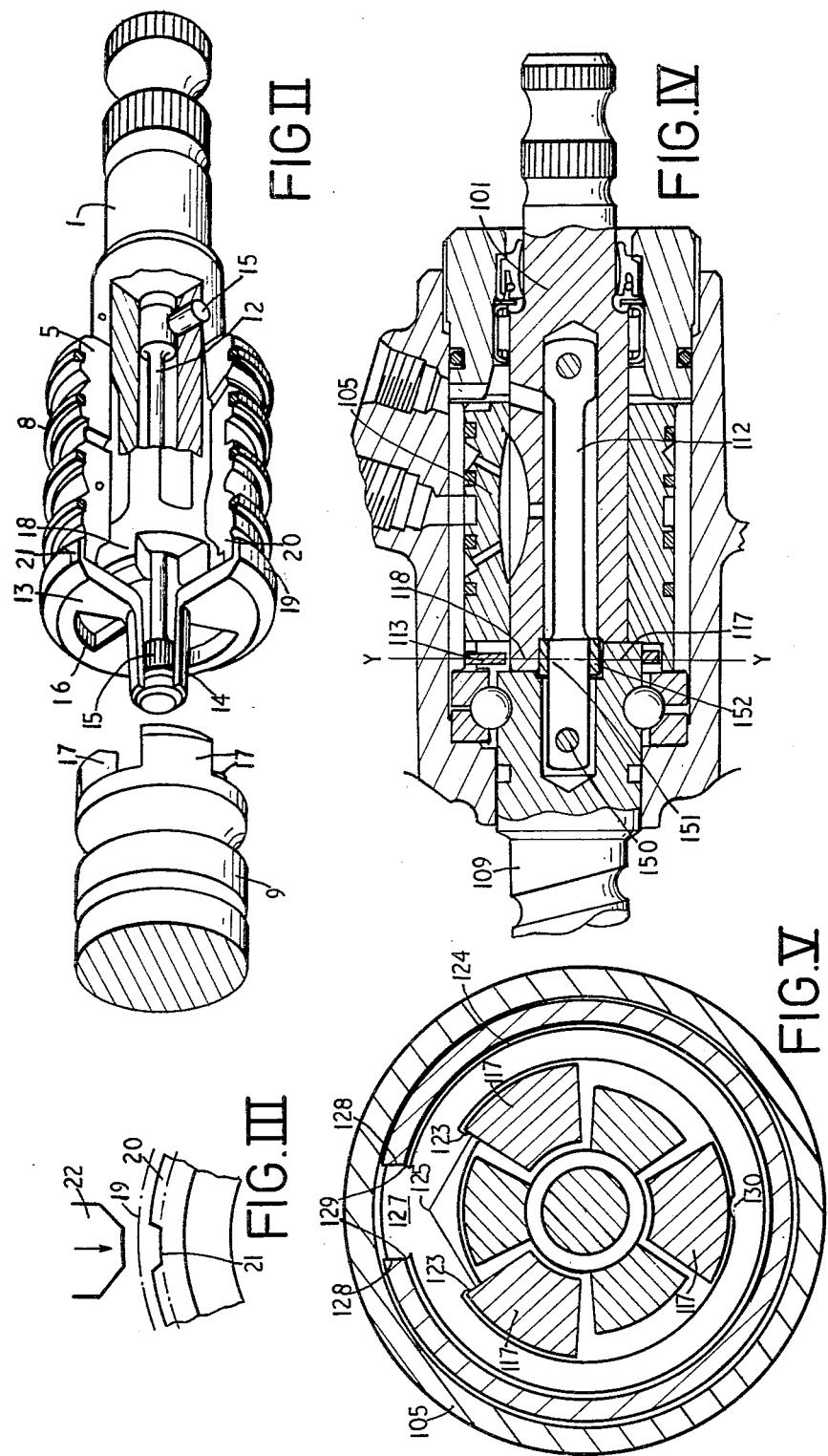

ROTARY VALVES

This invention relates to rotary hydraulic valves using torsion bar centering as are increasingly used to control the hydraulic assistance in power steering gears for trucks, buses and passenger cars whether of the integral or rack and pinion type.

Conventionally a rotary valve is employed having an inner valve member and an outer valve member or sleeve surrounding it.

The sleeve valve has axially arranged ports on its inner surface and a number of grooves on its outer periphery for communicating oil to and from the valve pair as is well known in the art.

The input-shaft-valve member, henceforth called the input member, drives the first member of the reduction mechanism of the steering gear, henceforth called the driven member in two different modes, as will be described later. The driven member of an integral steering gear is generally a recirculating ball screw, or an hourglass worm for these two respective species. For rack and pinion steering gears, the driven member is the pinion.

The inner valve member is frequently made integral with the input shaft itself, as illustrated in U.S. Pat. No. 3,145,626 as applied to an integral gear, and in British Pat. No. 1,241,428 applied to a rack and pinion gear.

The sleeve is arranged to be driven by the driven member in a slack-free member usually by a pin projecting radially from the latter by engaging a slot or hole in the sleeve. The functional requirements of the connection between the input member, the driven member and the sleeve are quite complex, and improvements thereto are the core of this invention.

One mode of connection between the input member and driven member is by a torsion bar which always tends to restore these parts to a neutral or centered angular position in relation to each other. The torsion bar, at its upper end (that is the end closer to the steering wheel) is connected to the input shaft and at its lower end to the driven member. Any torsion bar twist is therefore accompanied by rotation between the input shaft and sleeve, with consequent operation of the rotary valve and hence the application of hydraulic power assist.

Maximum power assist is generally associated with a normal maximum valve operating angle of about 3.5° for most rotary valves. In any given valve, the angle or twist of the torsion bar to reach maximum pressure either way from the neutral position must, according to accepted practice, be equal within 5' to 10' to assure satisfactory 'trim,' or symmetry of operation.

It frequently happens that the input member and the driven members are not precisely coaxial when in operation. For example, the driven member axis may be displaced laterally due to machining errors, distortion of components under load, or as a result of wear and subsequent adjustment of the steering gear. This non-coaxiality occurs particularly in designs which journal the upper end of the input member in the steering gear housing and the lower end directly to the driven member. Journalling between the input and driven members is made quite short, to accomodate, without bind, alignment errors between their axes, which will inevitably occur with this arrangement. Journalling can be considered to occur at the midpoint of this short journal.

Earlier, reference was made to the pin drive connection which is usually provided between the sleeve and the driven member. This also is arranged to accomodate some alignment error between these members without bind. If the plane in which this connection is arranged intersects the axis of the valve at a point displaced axially from the midpoint of the short journal just referred to, and there is an angular alignment error between the input and driven members, then an error rotational displacement will occur between the sleeve and the input member. This error in 'trim' of the steering gear increases and decreases cyclically with rotation of the valve and may well result in asymmetric operation outside the limits referred to earlier as desired practice.

In the prior art steering gears in which the input shaft is journalled on the driven member, it has not been possible to provide that the 'point' of such journalling coincides with the plane of drive between the sleeve and the driven member, and hence such gears are subject to this 'trim' error. Preferred forms of the invention can provide systems immune from this source 'trim' error.

A second mode of connection between the input and driven members occurs when there is a failure of the power assist, when the relative rotation between the input and driven members will increase beyond the normal maximum angle of about 3.5° previously referred to, generally to about double this value, when a positive connection must be provided to avoid further twisting of the torsion bar. This positive connection must transmit the very considerable torque which is required of the driver to steer the vehicle power-off. Typically, a loose-fitting spline or tongue-and-slot arrangement is used. It is an accepted requirement that no damage to either member occurs when loads of up to 200 lbs are applied by the driver to the rim of the steering wheel.

Prior art systems are often deficient in this regard, and rotary valves incorporating the invention may be constructed to provide increased capacity to transmit the large power-off torque in a simple low-cost manner.

In order to prevent over stressing of the torsion bar during power-off condition the angular over-travel in either direction from the normal maximum angle to the positive connection must be kept to a minimum, which calls for accurate angular spacing and symmetry of all elements in the valve affecting angular travel. In existing practice, a separate pin drive or other device is used to connect between the driven member and the sleeve, independent of the positive connection, in construction, according to the invention, one element of the positive connection serves the dual function of providing the drive between the input and driven members in both modes of operation of the valve. This reduces the sources of error leading to overstressing of the torsion bar. It is important in rotary valves that a very close angular relationship be maintained between relative rotation of the sleeve and the driven member to retain exact symmetry of trim. For this reason, a slack-free drive between the driven member and the sleeve is essential, and rotary valves according to the invention may be constructed to provide a cheap, slack-free drive for this purpose.

The steering gear is often located in an area of the vehicle where few compromises in respect of geometry may be made, and where the total space available, particularly length space, to locate the steering gear is limited. Frequently, for integral gears, the total length of the vehicle is influenced by the distance between the sector shaft axis and the housing surrounding the valve. It is thus important that the valve length be minimal and it is thus desirable to provide an axially most compact valve arrangement consistent with uncompromised performance.

Typically, in the manufacture of most rotary valve steering gears, the angular relationship between the various elements comprising the valve, including the driven member of the steering gear and the torsion bar, are adjusted at final assembly in a delicate 'trimming' operation such that the valve, when at rest, is in the hydraulic neutral condition within 5' to 10' as referred to earlier. This hydraulic neutral condition is determined by flowing oil through the valve. One connecting point, usually between the torsion bar and the input or driven members, which has been left angularly free until this moment, is now fixed by drilling, reaming and inserting a pin. The torsion bar must extend through the input member or the driven member for gripping during the operation. Because of this requirement, an additional leakage point is created. In construction according to the present invention an intermediate locking member is introduced between the sleeve and the driven member capable of sensitive angular adjustment relative to the sleeve to establish and retain the hydraulic neutral condition without need for drilling and pinning at assembly.

Two main embodiments of the invention are to be described, firstly, one in which this locking member is self-locking after adjustment at assembly, and secondly one in which the locking member is swaged and crimped to the sleeve in a permanent manner.

This intermediate member, which is carried by the positive, fail-safe, connection provided on the driven member, accomodates any misalignment of the input member to the latter, and generally accomplishes the various objects recited up to this point.

In a preferred embodiment of the invention, this intermediate member is also attached to the torsion bar at its lower end, so that all elements of the valve are self contained, readily removable from the gear, and unaffected by any alignment errors. This preferred embodiment is termed the plug-in valve assembly, and will now be described. The commercial advantages of the plug-in concept are considerable in that the know-how and expertise of valve making is different from that of the remainder of the steering gear, and an independent supplier could offer a highly specialised, high performance, low cost package to a number of users in a way not possible when the valve is incorporated in the steering gear by pinning.

The idea of a "plug-in" valve is not new. For example plug-in valves as shown in the specification of U.S. Pat. No. 3,033,051 have been in production since 1959. In this construction on removing screw 22 (after removal of the coupling) the valve assembly may be removed from the steering gear, disengaging slot 60 from pins 62, and lugs 100 on the driven member from fail-safe engagement with the abutment 17 of the input member. While superficially this looks similar to certain aspects of the embodiment of the present invention described below, there are several important differences.

Referring to FIG. 1 of that specification, the axis of screw 48 is determined by journalling as at 51 in piston 42 at the left hand end, and by its journalling as at 53 at the right hand end. As outlined in the specification, these journals will not always be coaxial, so that the screw 48 will lie at some (small) angle to the axis of the valve chamber. However, the valve assembly is locked up between thrust races 64 and 28, which are preloaded and hence it cannot take up an inclined disposition in the housing. For this reason this steering gear was never produced as shown, but rather bearing 53 was omitted and substantial diametral clearance provided between the valve assembly and the walls of valve chamber 24 (for example of the order of 0.020 inches).

Presumably this allowed valve assembly and shaft 48 to take up a mutually coaxial but offset position in the housing without bind, but necessarily results in the input member 16 taking up an inclined axis. Provision had already been made in the design for this eventuality, as implied by the fact that the valve member 70 was not formed integral with the input member as in the present invention but was intended to float within the sleeve 30 while being driven in a slack-free manner, by spherical headed pin 72. The journal (not numbered) at the lower end of the input member (to the torsion bar) is short, allowing such misalignment. However the mid-point of the short bearing is axially displaced from the plane of driving of pin 72, so that errors in alignment when assembled in the steering gear necessarily result in trim error. This largely negates the prime advantage of a plug-in valve so designed, in contrast to the present preferred embodiment of the invention, which combines the advantages of the plug-in feature with a total immunity to trim error at assembly. Other advantages of the preferred embodiment over the prior art plug-in valve just described will become apparent in the detailed description which follows. In addition to providing a plug-in valve construction, valves according to the present invention may be constructed to provide for a final trim of the valve assembly eliminating the need for pinning the torsion bar as a means of trim. Therefore the torsion bar, essentially a spring, subject to a vast number of stress reversals through its life can be made pre-drilled and hardened and tempered, and hence be made to have the high yield stress to sustain virtually an infinite number of stress reversals without fatigue. Practically, this means it can be shortened to approximately ⅔ the length as compared to that needed if the material is of a hardness capable of being readily drilled and reamed at assembly.

This axial compactness is essential to the achieving of the aim of providing a self-contained, plug-in valve package.

The invention consists in an improved rotary hydraulic valve to control the hydraulic assistance in power steering gears for automotive vehicles, comprising a valve input member, a coaxially arranged driven member, torsion bar means drivingly connecting said valve input member and said driven member, first drive transmitting means for transmitting drive from said valve input member to said driven member arranged for limited lost motion between said valve input and driven members comprising a plurality of axially extending inter engaging lug means alternately extending from said valve input and driven members, a valve sleeve member surrounding said valve input member, second drive transmitting means carried on a portion of the lug means of said driven member arranged to provide a slack-free driving connection between said valve sleeve member and said driven member, and means associated with said second drive transmitting means securing said valve sleeve member to said driven member in a preadjusted angular relationship.

It is preferred that there are three symmetrically arranged lug means having radially extending lateral faces on each of said valve input and driven members.

In order that the invention may be better understood and put into practice, a preferred form thereof is hereinafter described by way of example with reference to the accompanying drawings in which:

FIG. 1 is a section through a recirculating ball nut type steering gear of a type well known in the art incorporating a preferred form of the invention;

FIG. 2 is a perspective view of the plug-in valve removed from the assembly, and including a scrap view of the valve input member, FIG. 3 is a view of a portion of the valve shown in FIG. 2 illustrating the manner in which the intermediate member is secured to the valve sleeve, FIG. 4 is an axial cross-sectional view of a second form of the invention, and FIG. 5 is a cross-section on line YY of FIG. 4.

In FIG. 1 input member 1 is connected in a manner not shown to the steering wheel shaft, and is journalled in valve housing 2 in needle bearing 3 and provided with input seal 4.

Input shaft 1 carries sleeve 5 having the usual longitudinal ports 6 on its inner periphery coacting with longitudinal ports 7 of input shaft 1 in the usual manner. Sleeve 5 has a number of seals 8 provided in its outer periphery separating circumferential grooves and radial holes which communicate to the ports. The various holes and drillings are not shown here in detail as these features are well known in the art of rotary valves. It will be noted however, that radial clearance exists between the periphery of sleeve 5 and the inner bore of housing 2 so that a degree of misalignment of the axis and input shaft 1 can be accomodated without binding.

Recirculating ball screw (the driven member) 9 is journalled at its right hand end as seen in FIG. 1 (its upper end) in valve housing 2 both axially and radially in ball bearing 9A, and at its lower end engages the piston rack member 10 for reciprocation thereof through balls 10A. The teeth 11 of piston rack member 10 engage teeth of the sector shaft 11A in the usual manner.

As also well known in the art of rotary valves, two modes of connection must be provided between input member 1 and driven member 9.

Firstly, a torsionally resilient connection is provided by torsion bar 12 which is permanently united to intermediate member 13 by swaging the hub section 14 of intermediate member 13 down around the splines formed on the lower enlarged end 15 of torsion bar 12. The upper end of torsion bar 12 is also enlarged and connected by a pin 15A to input shaft 1. Intermediate member 13 has a flange pierced by three windows 16. These windows engage neatly the three protruding lugs 17 formed on the upper end of driven member 9 near their roots, leaving free their extended tips. Thus a resilient drive is obtained between 1 and 8 through torsion bar 12.

Secondly, input shaft 1 has at its lower end three axially protruding lugs 18 having radial faces (as are also the faces of lugs 17) but which subtend a lesser angle about the shaft axis then the gap between adjacent lugs 17. Thus a lost motion connection is provided which becomes a positive connection after a relative rotation either way between 1 and 8 of typically 7°. Note that this engagement occurs only on the extended section of lugs 17 which are free of their engagement with intermediate member 13.

This interrelation of the two sets of inter-engaging lugs is seen more clearly in an alternate form of the invention illustrated in FIG. 5. In respect of these lug elements, the preferred construction now being described and the alternate form are identical.

The flange of intermediate member 13 is turned at its periphery into a cylindrical rim 19 which closely fits to and surrounds a cylindrical rib 20 formed in the periphery of sleeve 5.

This rim 19 of member 13 is rolled over rib 20 so as to permanently unite 13 and 5. Furthermore, to prevent relative rotation between 13 and 5, the rim 19 is deformed into a notch provided at 21 in sleeve 5, see FIG. 3.

However it is necessary before effecting such a fixing to so angularly relate intermediate member 13 and sleeve 5 that with torsion bar 12 free of twist, ports 6 and 7 of the sleeve and input shaft respectively are exactly symmetrically placed in respect of each other. To do this the assembly shown in FIG. 2 is inserted in a test fixture and oil is flowed through the valve exactly as when the valve is installed in the steering gear. Input shaft 1 is rotated slightly in right and left turn directions while all other parts remain fixed, and the pressure rise in the oil flowing into the assembly is noted. Sleeve 5 is now rotated through slight angles right and left until exact symmetry of pressure rise is obtained. Flange 19 is now crimped around ribs 20 and into a groove formed in rib 20 as at 21 as for example by a punch as at 22 (FIG. 3). Note that the lower end of input shaft 1 is journalled to driven member 9 only indirectly. Thus input shaft 1 is a close fit in sleeve 5, and is in effect journalled in 5, which is now united to intermediate member 13. Now 13 rides on a portion of the lug 17 of item 9 thus determining that the intersection of the axes of input shaft 1 and driven member 9 occur in the mid plane of flange 13 as at plane XX.

It will be noted that the 'trim' of this assembly is now locked permanently and totally unaffected by any lack of coaxiality of its axes with driven member 9 as is the case with the prior art as described earlier.

An alternate form of the invention is illustrated in FIG. 4 and 5, which provides most of the advantages of the preferred form, but not the plug-in feature. In this form of the invention intermediate member 113 takes the form of a spring ring which is carried on the lugs 117 of 109.

In the enlarged sectional view of FIG. 5 it can be seen that 113 rides on two lugs of the three lugs 117 as at 123, while at a third point, as at 130, it contacts the third lug 117 in an interference manner. Note, as previously, the extended tips of lugs 117 are free to engage the three similar lugs extending from the lower end of input shaft 101.

There is adequate clearance 124 between the outer diameter of 113 and inner surface of sleeve 105 so that a limited degree of rotation of 113 is possible about a centre as at 125. This limited rotation will cause arm 127 of intermediate member 113 to shift sideways so that its arcuate faces 129, bearing on the sides of a slot 128 in sleeve 105 cause relative rotation between 105 and 109. The interference engagement as at 130 is sufficient to effectively lock the parts once set. Note that other than for the method of locking, the method of effecting trim as described for the preferred embodiment is the same for this embodiment.

Torsion bar 112 is pinned directly to driven shaft 109 as at 150 and is formed as a journal for the lower end of 101 as at 151. A bronze bush 152 inserted in the extended lugs 118 of 105 provides the lower end journal between 101 and 109 in this embodiment.

Note that bush 152 is kept short and at its mid point is arranged to lie in the centre plane YY of 113 so as to prevent any lack of alignment between 101 and 109 affecting the exact setting of trim, once established.

I claim as my invention:

1. An improved rotary hydraulic valve to control the hydraulic assistance in power steering gears for automotive vehicles, comprising a valve input member, a coaxially arranged driven member, torsion bar means drivingly connecting said valve input member and said driven member, a first drive transmitting means for transmitting drive from said valve input member to said driven member arranged for limited lost motion between said valve input and driven members comprising a plurality of axially extending and projecting inter-engaging lug means alternately extending from said valve input and driven members, a valve sleeve member surrounding said valve input member, second drive transmitting means carried on a projecting portion of the lug means of said driven member arranged to provide a slack-free driving connection directly through the said portion of the lug means of said driven member between said valve sleeve member and said driven member.

2. A valve as claimed in claim 1 wherein said lugs include a plurality of lugs having radially extending sides on each of said valve input and driven member arranged symmetrically around the axes of the said members.

3. A valve as claimed in claim 1 wherein one end of the torsion bar means is connected to the valve input member and the other end is connected to said second drive transmitting means and through it to said driven member.

4. A valve as claimed in claim 3 wherein the valve input member, the valve sleeve member, the torsion bar means and the second drive transmitting means are constructed as a unit capable of being inserted as such into a suitable valve housing to cause said lug means on said valve input member to inter engage with said lug means on said driven member.

5. A valve as claimed in claim 3 wherein said second drive transmitting means consists of a member having a central boss within which said other end of the torsion bar means lies and with which it is in driving connection, said central boss carrying rigid therewith a radially outwardly extending annular portion having in it apertures corresponding to and fitting closely the lug means on the driven member.

6. A valve as claimed in claim 5 wherein said annular portion has an outer flange overlying one end of said valve sleeve member, said valve sleeve member having at least one peripheral notch into which a portion of said outer flange is deformed to secure said valve sleeve member and said driven member in a trimmed preadjusted relationship.

7. A valve as claimed in claim 3 wherein said torsion bar means is of material that has been hardened to an extent that it is not capable of being readily drilled and reamed.

8. A valve as claimed in claim 1 wherein the axes of said valve input member and of the driven member if not parallel intersect at a point in a plane passing through the portion of the lug means of said driven member on which said second drive transmitting means is carried.

* * * * *